(12) United States Patent
Sun

(10) Patent No.: US 7,828,445 B2
(45) Date of Patent: Nov. 9, 2010

(54) HEAT DISSIPATION DEVICE FOR A DISPLAY PROJECTOR LAMP MODULE

(75) Inventor: Ming-Chih Sun, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 488 days.

(21) Appl. No.: 11/961,265

(22) Filed: Dec. 20, 2007

(65) Prior Publication Data

US 2009/0103055 A1    Apr. 23, 2009

(30) Foreign Application Priority Data

Oct. 17, 2007   (CN) .................. 2007 1 0202099

(51) Int. Cl.
*G03B 21/16* (2006.01)
(52) U.S. Cl. ........................................ 353/52
(58) Field of Classification Search .............. 353/57, 353/61, 74, 52, 60; 348/85; 362/11, 84, 362/382; 165/182, 272
See application file for complete search history.

(56) References Cited

U.S. PATENT DOCUMENTS

| 7,064,956 | B2 | 6/2006 | Patel | |
| 2007/0115438 | A1* | 5/2007 | Tsubura | 353/57 |

FOREIGN PATENT DOCUMENTS

| CN | 1381766 A | 12/2002 |
| CN | 1779555 A | 5/2006 |

* cited by examiner

*Primary Examiner*—Georgia Y Epps
*Assistant Examiner*—Don Williams
(74) *Attorney, Agent, or Firm*—Jeffrey T. Knapp

(57) ABSTRACT

A display projector lamp module includes a lamp, a mounting member supporting the lamp, a metal cover and a heat pipe. The mounting member and the metal cover cooperates to defines a room, and the lamp is received in the room. A plurality of first and second fins is mounted on opposite sidewalls of the cover to dissipate heat generated by the lamp. The heat pipe is mounted around a periphery of the cover and thermally contacts with the first and second fins.

13 Claims, 4 Drawing Sheets

HEAT DISSIPATION DEVICE FOR A DISPLAY PROJECTOR LAMP MODULE

BACKGROUND OF THE INVENTION

1. Field of the Invention

The present invention relates to a display projector lamp module, and particularly to a display projector lamp module having heat dissipation device to improve heat dissipation efficiency thereof.

2. Description of Related Art

Image display projectors generate display images and project them to display screens for viewing by one or more viewers. The display images are formed and projected by passing light from a high-intensity light source such as a plurality of high intensity lamps through an image-forming medium such as a translucent film or liquid crystal display. Alternatively, the display images are formed through digital light processing which uses digital micromirror devices to form the display images. It is generally known that the high-intensity light source implemented in known image display projectors typically generates a large amounts of heat. In addition, as the high-intensities, e.g., 2000 or more lumens, the amount of heat generated by these light sources has also increased. Furthermore, the display projector is used in a high heat state for a long time and the life time of the display projector is consequently shortened.

Conventional image display projectors include fans to blow air over the light sources and lamp reflectors to cool them by forced convection. In this regard, conventional image display projector is typically housed in a metal cover and includes a plurality of inlets and outlets formed on opposite sidewalls of the cover. The inlets enable cool air to be drawn into the display projector, and the outlets enable heated air to exhaust from the display projector. When the heated air flows out from the outlets of the projector, heat generated by the light sources is absorbed by the cover near the outlets. Thus, heat generated by the light sources is accumulated in the cover near the outlets, and a temperature of the outlets is higher than other portions of the cover; thus, increasing the risks of injury (such as being scaled) when handling or accidentally touching the image display projector.

What is needed, therefore, is a new display projector lamp module having a heat dissipation device which can overcome the above-described disadvantages.

SUMMARY OF THE INVENTION

A display projector lamp module includes a lamp, a mounting member supporting the lamp, a metal cover and a heat pipe. The mounting member and the metal cover cooperate with each other to define a room, and the lamp is received in the room. A plurality of first and second fins is mounted on opposite sidewalls of the cover to dissipate heat generated by the lamp. The heat pipe is mounted around a peripheral of the cover and thermally contacts with the first and second fins.

Other advantages and novel features will become more apparent from the following detailed description of preferred embodiments when taken in conjunction with the accompanying drawings, in which:

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE INVENTION

Figure 1:
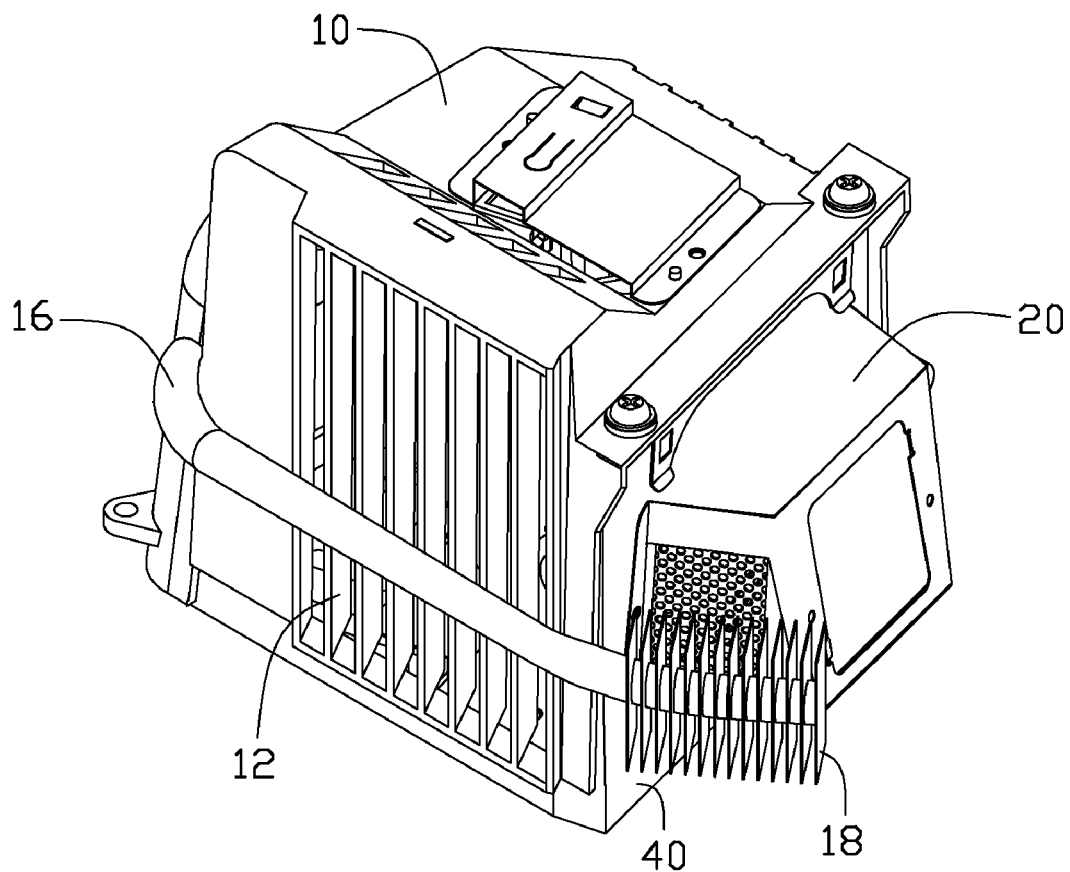
FIG. 1 is an assembled view of a display projector lamp module having a heat dissipation device in accordance with a present embodiment of the present invention.
Figure 2:
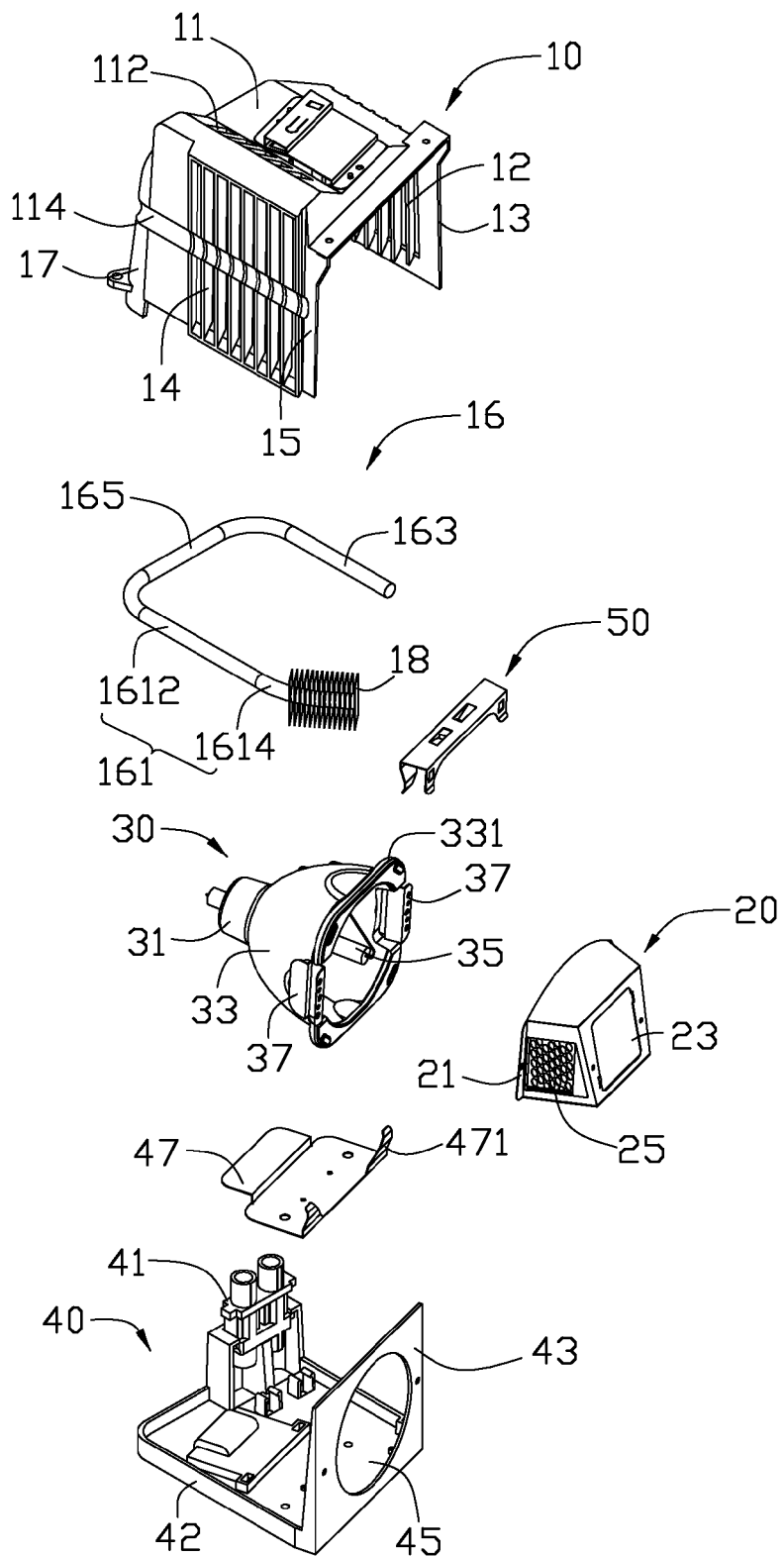
FIG. 2 is an exploded view of FIG. 1.

Referring to FIGS. 1-2, a display projector lamp module mounted in a display projector (not shown) in accordance with the present embodiment of the present invention includes a lamp 30, a metal lampshade 20 corresponding to the lamp 30, a mounting member 40 supporting the lamp 30 and a metal cover 10 cooperating with the mounting member 40 for housing the lamp 30 therein. A heat dissipation device is attached to the display projector lamp module. The heat dissipation device comprises a plurality of first fins 12 and second fins 14 formed on lateral sidewalls of the cover 10 respectively, and a heat pipe 16 mounted a peripheral of the cover 10 and thermally contacting the first and second fins 12, 14. A plurality of third fins 18 is mounted on a distal end of the heat pipe 16 near to the cover 20. The display projector defines a plurality of inlets (not shown) and outlets (not shown) opposing the inlets.

The mounting member 40 comprises a rectangular base 42, a driving circuit module 41 mounted on a rear side of the base 42 and a rectangular mounting plate 43 mounted on a front side of the base 42. The mounting plate 43 defines a central opening 45 therein. A spring plate 47 is mounted on the base 42 and forms a pair of spaced tabs 471 extending upwardly at front ends thereof.

Figure 3:
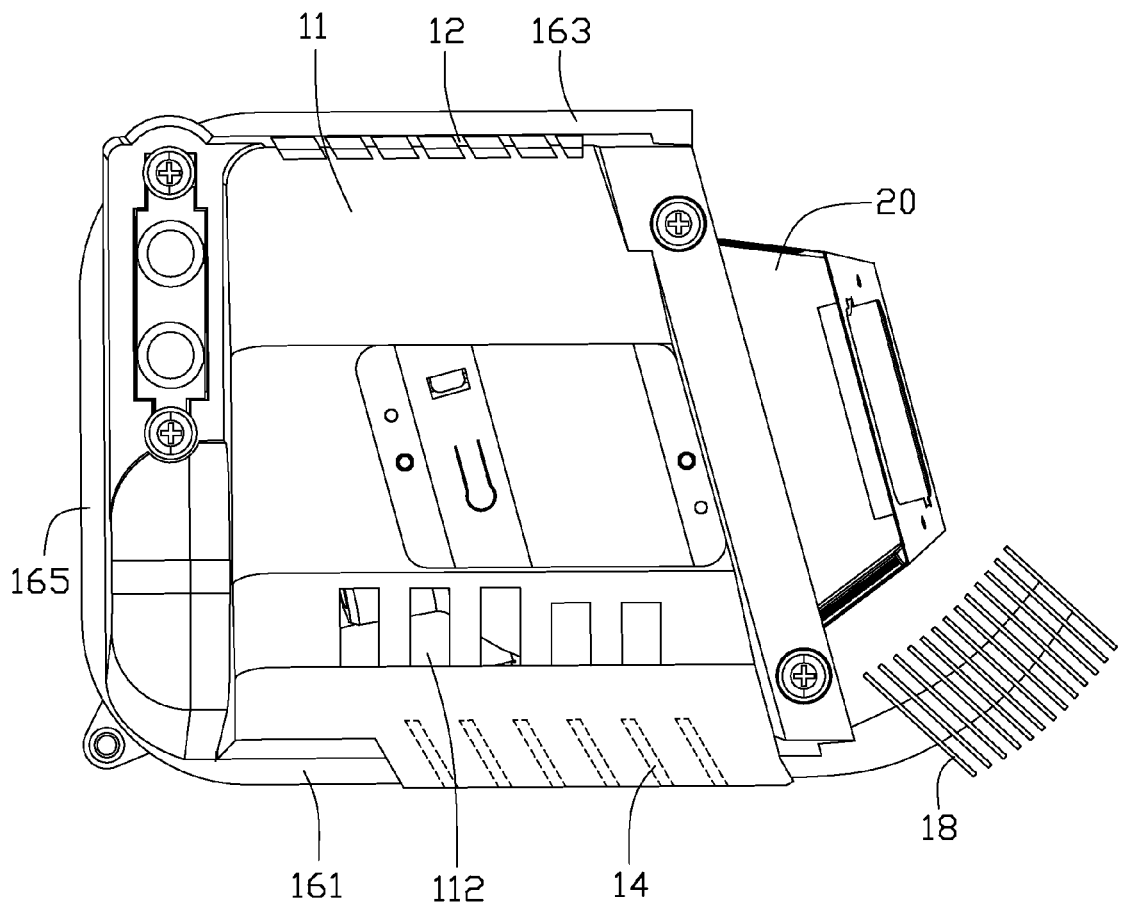
FIG. 3 is a top view of FIG. 1.
Figure 4:
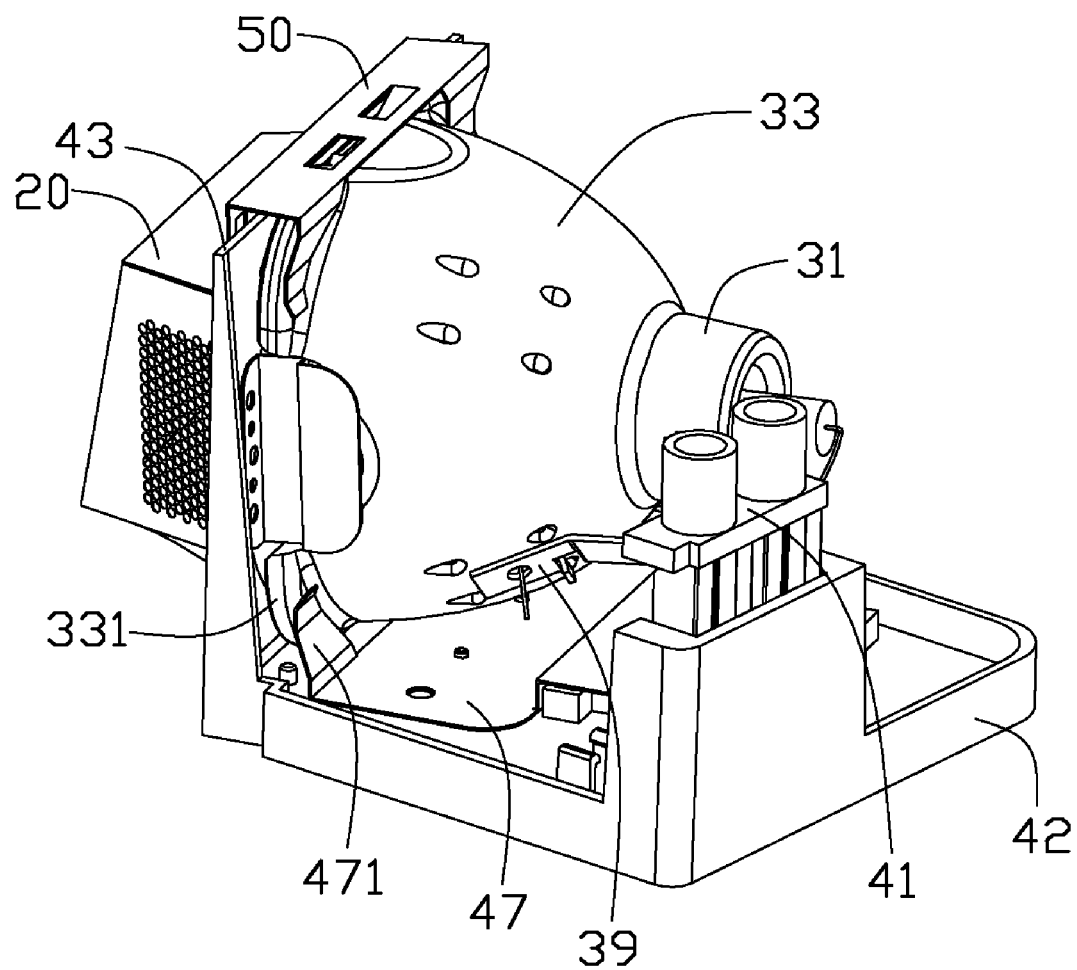
FIG. 4 is a partial assembled view of the display projector lamp module of FIG. 1, but a cover taken away for clarity.

Referring to FIGS. 3-4 also, the lampshade 20 is mounted on a front side of the mounting plate 43 away from the driving circuit module 41. The lampshade 20 has a bowl-shaped construction to define a chamber (not labeled) therein facing to the central opening 45 of the mounting member 40. An opening 23 is defined at a front side of the lampshade 20 and communicates with the chamber for providing passage of light emitted from the lamp 30. Two mounting plates 21 extend outwardly from opposite edges of a rear side and contact with the mounting plate 43. Screws (not shown) extend through the mounting plate 21 of the lampshade 20 and the mounting plate 43 of the mounting member 40 to be engaged in a nut (not shown) for attaching the lampshade 20 onto the mounting plate 43. Two groups of vents 25 are defined at lateral sides of the lampshade 20 for guiding airflow to pass through the lampshade 20.

The lamp 30 is mounted on a rear side of the mounting plate 43 of the mounting member 40 opposing the lampshade 20. The lamp 30 comprises a lamp holder 31, a lamp reflector 33 connecting with the lamp holder 31 and an elongated lamp wick 35 connecting with the lamp holder 31 and housed in the lamp reflector 33. An electric board 39 (shown in FIG. 4) is attached on an outside of the lamp reflector 33. The lamp holder 31 and the electric board 39 electronic connect with the driving circuit module 41 of the mounting member 40.

The lamp reflector 33 is made of a thermally conductive material. The lamp reflector 33 has a bowl-shaped construction with a housing (not labeled) facing to the chamber of the lampshade 20. The lamp reflector 33 forms upper and lower flanges 331 extending outwardly from a front end of the housing for facilitating a mounting of the lamp 30 on the mounting member 40. The lower flange 331 abuts against the tabs 471 of the spring plate 47 of the mounting member 40 to render a lower portion of the lamp reflector 33 to firmly contact with the mounting plate 43 of the mounting member 40. A clip 50 spans across and firmly grasps the upper flange 331 and a top portion of the mounting plate 43 to clamp an upper portion of the lamp reflector 33 and the mounting plate 43 together; thus, the lamp 30 is attached on the mounting plate 43. Two L-shaped sheets 37 corresponding to the mounting plates 21 of the lampshade 20 are formed at lateral sides of the lamp reflector 33 for engaging with the mounting plate 43 of the mounting member 40.

Referring to FIG. 2 again, the cover 10 is made of high-conductive metal, and comprises a top plate 11, two sidewalls 13, 15 extending downwardly from opposite edges of the top plate 11 respectively and a connecting plate 17 extending downwardly from another edge of the top plate 11 and connecting with the sidewalls 13, 15. The sidewalls 13, 15 and the connecting plate 17 intimately engage with edges of the base 42 at bottom ends and abut against the mounting plate 43 of the mounting member 40 at front ends to house the lamp 30 and the driving circuit module 41 in a room defined by the cover 10 and the mounting member 40. The lampshade 20 is located an outside of the cover 10. The top plate 11 has a substantially L-shaped configuration with a slantwise surface (not labeled). A plurality of evenly spaced apertures 112 is defined at the slantwise surface towards the sidewall 15. The sidewall 13 corresponds to the inlets of the display projector, and the sidewall 15 corresponds to and is near the outlets of the display projector. Each of the first and second fins 12, 14 is an elongated metal sheet and formed at an angle with the sidewalls 13, 15 respectively. Each of the first fins 12 extends downwardly from a top portion to a bottom portion of the sidewall 13 and is parallel with each other; thus, an inlet is defined between the adjacent first fins 12 for guiding airflow into the lamp 30. Each of the second fins 14 extends downwardly from a top portion to a bottom portion of the sidewall 15 and is parallel with each other; thus, an outlet is defined between the adjacent second fins 14 for guiding airflow out from the lamp 30. Each of the first fins 12 is parallel to each of the second fins 14, thus, a plurality of airflow passages is defined between the first and second fins 12, 14. A U-shaped groove 114 is defined at the peripheral of the cover 10 for receiving the heat pipe 16 therein. The groove 114 comprises a first groove (not labeled) and a third groove (not shown) defined at a centre of the sidewalls 13, 15 respectively along a transverse direction and a second groove (not labeled) defined at a centre of the connecting plate 17.

Referring to FIG. 3 again, the heat pipe 16 has a U-shaped configuration and comprises an evaporating portion 161, a condensing portion 163 and a connecting portion 165 interconnecting with the evaporating portion 161 and the condensing portion 163. The condensing portion 163 and the connecting portion 165 are straight. The evaporating portion 161 comprises a straight portion 1612 and a bent portion 1614 extending outwardly from the straight portion and towards the lampshade 20. The straight portion 1612 of the evaporating portion 161 is parallel to the condensing portion 163 and has a length equal to that of the condensing portion 163. The condensing portion 163 is received in the first groove of the groove 114. The connecting portion 165 is received in the second groove of the groove 114. The straight portion 1612 of the evaporating portion 161 is received in the third groove of the groove 114 and the bent portion 1614 of the evaporating portion 161 is located at an outside of the sidewall 15 and adjacent to a vent 25 of the lampshade 20. The third fins 18 are mounted on the bent portion 1614 of the evaporating portion 161. Each of the third fins 18 is parallel to and spaced from each other.

In use, when the lamp wick 35 emit light, heat is generated by the lamp wick 35. A minor part of the heat is absorbed by the lampshade 20 and a major part of the heat is accumulated in the lamp reflector 33. A fan (not shown) is mounted on an outside of the inlets of the display projector. During operation of the fan, a large amount of cooling air is drawn into the display projector lamp module. A part of cooling air is drawn into the cover 10 from the inlets between the first fins 12 and blew over the lamp reflector 33, then exhausted out the cover 10 from the outlets between the second fins 14 and the apertures 112 of the top plate 11, and finally exhausted out the display projector from the outlets of the display projector; thus, heat absorbed by the lamp reflector 33 is dispersed out from the display projector. A part of cooling air is drawn into the lampshade 20 from one group of vents 25 of the lampshade 20, then drawn into the lamp reflector 33 and exhausted out the lampshade 20 from another group of vents 25 passing through the third fins 18, and finally exhausted out the display projector from the outlets of the display projector; thus, heat accumulated in the lamp reflector 33 is dispersed out from the display projector. When the airflow passes the second fins 14 and the third fins 18 of the cover 10, a part heat generated by the lamp wick 35 is absorbed by the second and third fins 14, 18 and transferred to the first fins 12 via the heat pipe 16. Thus, a temperature of the sidewall 15 is depressed and a temperature of the outlets of the display projector is depressed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display projector lamp module comprising:
  a lamp;
  a mounting member supporting the lamp;
  a metal cover and the mounting member cooperating to define a room, the lamp received in the room;
  a plurality of first and second fins mounted on opposite sidewalls of the cover to dissipate heat generated by the lamp, wherein the plurality of first fins define an inlet therebetween for guiding airflow into the lamp, and the plurality of second fins define an outlet therebetween for guiding airflow out from the lamp; and
  a heat pipe mounted around a periphery of the cover and thermally contacting with the first and second fins.

2. The display projector lamp module as claimed in claim 1, wherein each of the first fins is parallel to each of the second fins, a plurality of airflow passages is defined between the first and second fins to communicate with the room defined by the cover and the mounting member.

3. The display projector lamp module as claimed in claim 2, wherein each of the first and second fins is an elongated metal sheet.

4. The display projector lamp module as claimed in claim 1, wherein the heat pipe comprises an evaporating portion in thermally contact with the second fins, a condensing portion in thermally contact with the first fins and a connecting portion interconnecting the evaporating porting and the condensing portion.

5. The display projector lamp module as claimed in claim 4, wherein the heat pipe has a U-shaped configuration, and the condensing portion and the connecting portion each having a straight portion, the evaporating portion comprising a straight portion parallel to the straight portion of the condensing portion and a bent portion bent towards the condensing portion.

6. The display projector lamp module as claimed in claim 5, wherein the bent portion of the evaporation portion is located at an outside of the cover and a plurality of third fins mounted thereon.

7. The display projector lamp module as claimed in claim 6, wherein each of the third fins is spaced to and parallel to each other.

8. The display projector lamp module as claimed in claim 1 further comprising a lampshade corresponding to the lamp and located at an outside of the cover and two vents being defined at lateral sides of the lampshade.

9. The display projector lamp module as claimed in claim 1, wherein the cover comprises a top plate, two sidewalls extending downwardly from opposite edges of the top plate respectively and a connecting plate extending downwardly from another edge of the top plate and connecting with the sidewalls, the first and second fins are formed at the sidewalls respectively.

10. The display projector lamp module as claimed in claim 9, wherein the top plate of the cover has a substantially L-shaped configuration and has a plurality of evenly spaced slantwise apertures toward the second fins.

11. The display projector lamp module as claimed in claim 10, wherein the mounting member comprises a base and a mounting plate formed a side of the base, the cover engages with the base and the mounting plate of the mounting member to house the lamp in the cover.

12. A heat dissipation device for a lamp assembly mounted in a display projector, the lamp assembly comprising a cover and a mounting member, the cover and the mounting member cooperating to form a room, a light source received in the chamber, the cover having two opposite sidewalls, the heat dissipation device comprising:
  a plurality of first fins mounted on one of the two opposite sidewalls and defining an inlet therebetween for guiding airflow into the room;
  a plurality of second fins mounted on the other of the two opposite sidewalls and defining an outlet therebetween for guiding airflow out from the room, wherein airflow passages defined between the first and second fins communicates with the room; and
  a heat pipe mounted surround three sides of the cover and coming in thermally contact with the fins.

13. The heat dissipation device as claimed in claim 12, further comprising a plurality of third fins mounted at a distal end of the heat pipe.

* * * * *